US010137492B2

(12) United States Patent
Dannheisig et al.

(10) Patent No.: US 10,137,492 B2
(45) Date of Patent: Nov. 27, 2018

(54) METHOD FOR CONNECTING A FIRST COMPONENT TO A SECOND COMPONENT

(71) Applicant: JOHNSON CONTROLS GMBH, Burscheid (DE)

(72) Inventors: Andreas Dannheisig, Sassenberg (DE); Maximilian Platvoet, Remscheid (DE); Ludger Mühlenbrock, Recklinghausen (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 146 days.

(21) Appl. No.: 15/105,223

(22) PCT Filed: Dec. 16, 2014

(86) PCT No.: PCT/EP2014/078005
§ 371 (c)(1),
(2) Date: Jun. 16, 2016

(87) PCT Pub. No.: WO2015/091515
PCT Pub. Date: Jun. 25, 2015

(65) Prior Publication Data
US 2016/0311007 A1    Oct. 27, 2016

(30) Foreign Application Priority Data

Dec. 17, 2013  (DE) .................. 10 2013 020 832
Mar. 31, 2014  (DE) .................. 10 2014 206 027

(51) Int. Cl.
*B21D 39/04*    (2006.01)
*H01S 3/00*    (2006.01)
(Continued)

(52) U.S. Cl.
CPC ............. *B21D 39/06* (2013.01); *B21D 37/16* (2013.01); *B21D 39/046* (2013.01); *C21D 1/42* (2013.01);
(Continued)

(58) Field of Classification Search
CPC .... B23P 11/025; B23P 11/005; B21D 39/046; B21D 37/16; Y10T 29/49908;
(Continued)

(56) References Cited

U.S. PATENT DOCUMENTS 4,782,571 A    11/1988    Krips et al.
5,458,393 A    10/1995    Benedyk

FOREIGN PATENT DOCUMENTS

CN    871 02 477 A    10/1987
CN    19 31 467 A    3/2007
(Continued)

*Primary Examiner* — Jermie Cozart
(74) *Attorney, Agent, or Firm* — McGlew and Tuttle, P.C.

(57) ABSTRACT

A method is provided for connecting a first component to a second component, wherein the first component has a deformation region. The deformation region is at least partially heated in a first step. In a second step an inner die, having an optical component for plastic deformation, is provided. In a third step the first component is plastically deformed in the deformation region in order to connect the first component to the second component. Light for heating the first component is directed at the deformation region by means of the optical component of the inner die in the first and/or third step.

9 Claims, 1 Drawing Sheet

(51) Int. Cl.
 *B21D 39/06* (2006.01)
 *C21D 1/42* (2006.01)
 *G02B 7/18* (2006.01)
 *B21D 37/16* (2006.01)

(52) U.S. Cl.
 CPC .......... *G02B 7/1815* (2013.01); *H01S 3/0071* (2013.01); *Y10T 29/49908* (2015.01); *Y10T 403/4966* (2015.01)

(58) Field of Classification Search
 CPC .......... Y10T 29/49927; Y10T 29/4992; Y10T 29/49915; Y10T 403/4966; Y10T 403/4941; C21D 9/08; C21D 1/42; G02B 7/1815; H10S 3/0071; H10S 3/0401
 See application file for complete search history.

(56) References Cited

FOREIGN PATENT DOCUMENTS

| | | |
|---|---|---|
| CN | 101 274 347 A | 10/2008 |
| CN | 101 415 505 A | 4/2009 |
| CN | 102 672 062 A | 9/2012 |
| DE | 10 2004 062 896 B4 | 9/2006 |
| DE | 10 2012 013 750 A1 | 12/2013 |
| GB | 22185 A | 8/1907 |
| JP | S60 162730 A | 8/1985 |
| JP | 2005 224844 A | 8/2005 |
| WO | 103 406 417 A | 11/2013 |

METHOD FOR CONNECTING A FIRST COMPONENT TO A SECOND COMPONENT

CROSS REFERENCE TO RELATED APPLICATIONS

This application is a United States National Phase Application of International Application PCT/EP2014/078005 filed Dec. 16, 2014 and claims the benefit of priority under 35 U.S.C. § 119 of German Applications 10 2013 020 832.7 filed Dec. 17, 2013 and 10 2014 206 027.3 filed Mar. 31, 2014, the entire contents of which are incorporated herein by reference.

FIELD OF THE INVENTION

The present invention relates to a method for connecting two components by means of plastic deformation.

BACKGROUND OF THE INVENTION

In automobile construction, components are nowadays connected to one another ever more frequently by plastic forming, preferably by tensile-compressive forming, such as for example upset bulging, crimping or flanging. Compared with other joining methods, such as welding, connecting by plastic forming has the advantage for example of a lower cycle time in the production process and the avoidance of coating problems caused by the formation of scale. Particularly coating problems sometimes have to be laboriously reworked and are therefore undesired. The thin-walled components that are required for plastic forming, preferably tubes, for their part require auxiliary means or methods for the plastic deforming, in order to further improve the quality of the connection between the components produced by plastic forming.

SUMMARY OF THE INVENTION

An object of the present invention is to provide a method or an auxiliary means by which the connecting of a first component to a second component by plastic deformation is further improved.

This object of the present invention is achieved by a method for connecting a first component to a second component, wherein the first component has a deformation region, wherein in a first method step the deformation region is at least partially heated, wherein in a second method step an inner die with an optical component for the plastic deformation is provided, wherein in a third method step the first component is plastically deformed in the deformation region to connect the first component to the second component and wherein in the first and/or third method step light for heating the first component is directed onto the deformation region by way of the optical component.

It is advantageously possible here to heat a first and/or second subregion during the plastic deformation. This has the advantage in comparison with the prior art that heat losses due to cooling down during the time between the heating and the deformation can be advantageously avoided. Furthermore, in the method according to the invention, the heating can be controlled or monitored during the plastic forming. As a result, the heating can be advantageously adapted as efficiently as possible to the plastic deformation. The plastic forming preferably comprises a tensile-compressive forming, in particular an upset bulging, a crimping and/or a flanging. Preferably, the plastic deformation of the first component creates bulges which interact in an interlocking and/or frictionally engaging manner along at least one direction. In particular, the connection between the first and the second component is obtained by the interlocking and/or frictionally engaging interaction.

Advantageous refinements and developments of the invention can be taken from the subclaims and the description with reference to the drawings.

In a further embodiment of the present invention, it is provided that the first component is formed by a hollow body, preferably a hollow body with an axis of symmetry. In particular, it is a tube, for example a seat cushion tube for a vehicle seat. Furthermore, the hollow body has an inner side, facing the axis of symmetry, and an outer side, facing away from the axis of symmetry. Parts of the first component that are not to be included in the forming process may be advantageously supported on the inner die during the plastic deformation. In particular, it is provided that a wall of the inner die defines an inner die cavity, it being possible for the optical component to be arranged within the inner die cavity. Preferably, a multiplicity of optical components are arranged in the inner die cavity. As a result, an inner die in which the optical components required for the heating of the first component are integrated can be advantageously obtained. In this way, the inner die advantageously serves both as an auxiliary means for the heating and as an auxiliary means for the plastic deformation.

In a further embodiment of the present invention, it is provided that in the second method step the inner die is arranged in the hollow body of the first component and in the first method step and/or in the third method step light is directed onto the inner side of the hollow body of the first component. In particular, it is provided that at least part of the inner die is arranged directly adjacent, preferably adjoining, the deformation region, along a direction running perpendicularly in relation to the axis of symmetry. Furthermore, it is conceivable that the inner die is arranged within the first component in such a way that the optical components and part of the deformation region are arranged in a plane running perpendicularly in relation to the axis of symmetry.

In a further embodiment, it is provided that in a fourth method step the inner die is removed from the first component, preferably is contactlessly withdrawn from the hollow body.

In a further embodiment, it is provided that the deformation region is irradiated in a first subregion, the light for heating the first subregion being passed through a first clearance in a wall of the inner die. By the positioning of the first clearance, it can be advantageously determined at which location the inner side of the first component is to be heated. Furthermore, it is conceivable that the wall has a second clearance for the optical irradiation of the second subregion, the distance between the first subregion and the second subregion being defined by the distance between the first clearance and the second clearance. In particular, it is provided that the optical component is arranged within the inner die cavity in such a way that the light is directed through the first and/or second clearance even when the inner die is turned. In particular, it is conceivable that the inner die is turned or rotated during the first and/or the second method step. As a result, the deformation region on the inner side of the first component is optically irradiated at the locations at which the first and/or the second clearance move(s) along during the turning. This advantageously allows the clearance to be dimensioned in such a way that the inner die makes sufficient surface area available to the first component for supporting, in particular in the deformation region.

In a further embodiment of the present invention, it is provided that the light for heating the first component is conducted by way of further optical components, preferably filters, lenses, beam-spreading systems or the like. Preferably, a laser, preferably a diode laser or semiconductor laser, is used as the light source in order to provide the light for heating the first component. A conducting system consisting of further optical components allows the preferably directed light beam to be qualitatively assessed. Among other things, this advantageously facilitates the focusing of the light onto the first and/or the second subregion. Furthermore, it is conceivable that the optical components and/or the further optical components have means for focusing, such as for example a lens, a parabolic mirror or a hollow mirror. It is preferably a diffractive element that is used for the focusing. In particular, it is provided that the light is focused onto the inner side of the first component, in order to advantageously increase the efficiency of the heating in comparison with irradiation with non-focused light.

In a further embodiment, it is provided that the thermal state of the first component is monitored by means of a detector unit in the first method step, in the second method step and/or in the third method step. As a result, a potential problem in producing the connection can be advantageously detected in good time and counteracted. The detector unit is preferably a thermal detector, in particular a pyrometer.

In a further embodiment of the present invention, it is provided that, for monitoring the inner side of the first component, information concerning the thermal state is passed by way of the optical component and/or further optical components to the detector unit. Preferably, the light for heating and the information concerning the thermal state of at least part of the first component are passed to the detector unit by way of a common system comprising optical components and further optical components. As a result, an observation unit comprising the detector unit can be integrated in as space-saving a way as possible in the method for connecting the first component to the second component. In particular, the number of additional optical systems necessary for the monitoring of the thermal state is advantageously reduced. Additional optical systems may be for example a further lens or a further axicon.

A further subject of the present invention is an inner die with an optical component, wherein the optical component is configured in such a way that light for heating part of the first component can be directed onto a deformation region of the first component by way of the optical component. As a result, the first component, in particular the deformation region, can be advantageously heated during the deformation of the first component.

In a further embodiment, it is provided that a wall of the inner die defines an inner die cavity, the optical component being arranged within the inner die cavity, the wall having at least one clearance. As a result, the optical systems necessary for the heating can be integrated in the inner die in a particularly space-saving way.

Further details, features and advantages of the invention emerge from the drawings and from the subsequent description of preferred embodiments on the basis of the drawings. The drawings thereby merely illustrate embodiments of the invention that are given by way of example and do not restrict the essential concept of the invention.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
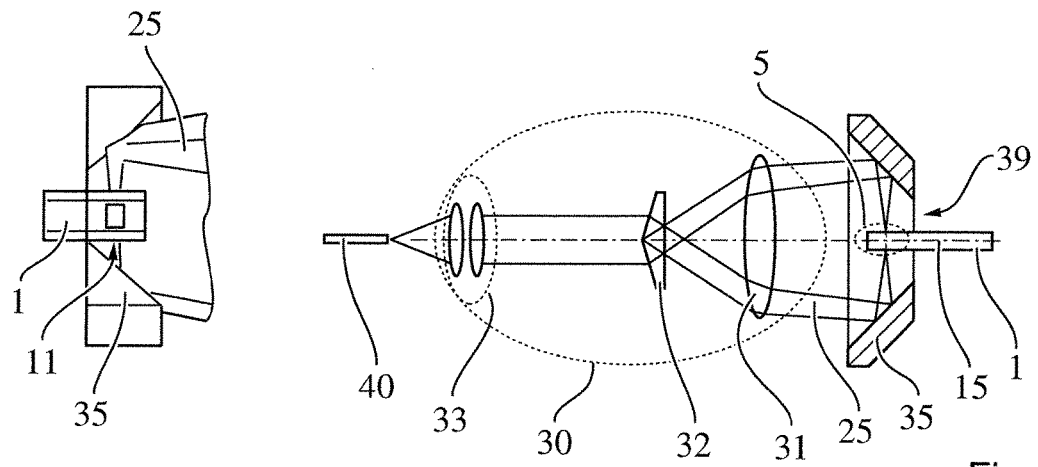
FIG. 1 shows a method for heating a first component in a deformation region according to the prior art.

Referring to the drawings, in the various figures, the same parts are always provided with the same designations and are therefore generally also only referred to or mentioned once in each case.

In FIG. 1, a method for heating a first component 1 in a deformation region 5 is represented. The first component 1 is preferably a hollow body with an axis of symmetry 15, in particular a tube, the hollow body having an inner side 12, facing the axis of symmetry 15, and an outer side 11, facing away from the axis of symmetry. It is typically provided that in a first method step the first component 1 is at least partially heated in a deformation region 5. Preferably, the deformation region 5 is heated in a first subregion and/or in a second subregion. Furthermore, it is provided that in a second method step the second component 2 is arranged adjoining or against a third subregion of the deformation region. Preferably, the third subregion is arranged between the first and the second subregion. It is in this case provided that in a third method step the first and/or the second subregion is plastically deformed. Preferably, bulges 3 are created by the plastic deformation, the second component 2 interacting in an interlocking and/or frictionally engaging manner with the bulges 3 and the first component 1 thereby being connected to the second component 2. For the selective (spatially) punctiform heating of the first subregion and/or the second subregion, preferably light is used, in particular infrared light. In this respect, the prior art discloses a method in which light is directed by way of a cone mirror 35 onto the outer side of the first component for heating the first subregion. In FIG. 1, a beam 25 shows the path that the light takes from a light source 40 to the first component 1. In this case, the first component 1 is arranged within a clearance of the cone mirror 35, in particular along an axis of symmetry of the cone mirror. Generally, the use of the cone mirror 35 requires installation space to be available around the first component 1. This installation space is not generally available in machines for the plastic forming of the first component 1, as a result of which the heating of the first and/or second subregion is located elsewhere and consequently also has to take place at a time before the plastic deformation. The time difference between the heating and the plastic deformation therefore disadvantageously causes heat losses to occur in the case of the methods known from the prior art, since the first component 1 cools down between the heating in the first method step and the plastic deformation in the third method step.

Figure 2:
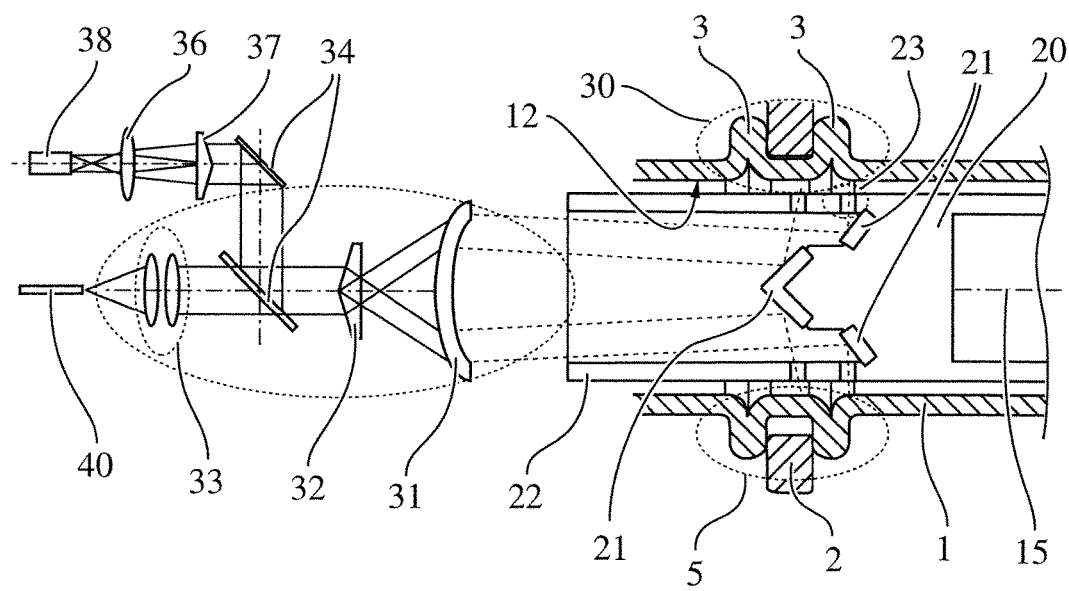
FIG. 2 shows a method for heating a first component in a deformation region according to a first embodiment of the present invention that is given by way of example.

In FIG. 2, a method for heating a first component 1 in a deformation region 5 according to a first embodiment of the present invention that is given by way of example is represented. It is provided here that in the second method step an inner die 20 with an optical component 21 is made available. Preferably, the inner die 20 is provided for a subregion that is not to be included in the forming process, such as for example the third subregion, to be supported on the inner die 20 during the plastic deforming in the third method step. Furthermore, it is provided that an inner die cavity is defined by a wall 22 of the inner die 20. Preferably, the wall 22 comprises a clearance 39 and an optical component 21 is arranged within the inner die cavity. In particular, it is provided that light is coupled into the inner die cavity and is directed onto the inner side 12 of the first component 1 by way of the optical component 21, through the clearance 39 in the wall 22. A region optically irradiated in such a way is advantageously heated. In particular, it is provided that the first and the third method step are carried out at the same time. As a result, heat losses due to a potential cooling down of the first component 1 can be advantageously avoided. In addition, the heating can be controlled as accurately as possible and adapted as individually as possible to the plastic deformation. Preferably, the optical components 21 comprise mirror elements, which are arranged and aligned within the inner die cavity. Preferably, the inner die 20 comprises a plurality of clearances 39 in the wall 22 and the distance between the first and the second subregion is defined by the distance between the individual clearances 39. Furthermore, it is conceivable that the distance between two clearances is variable. Preferably, the distance between the clearances is varied with the aid of a diaphragm system. As a result, an inner die 20 that can be used for various connections to second components 2 of different thicknesses can be obtained. It is also conceivable that the optical component 21 is arranged within the inner die cavity in such a way that the light is directed onto the first component 1 through the clearance 39 in the wall 22 irrespective of any turning of the inner die 20 about the axis of symmetry 15. Preferably, the inner die 20 is turned or rotated about the axis of symmetry 15 in the first method step. As a result, a first subregion, along which the clearance moves during the turning or the rotation, can be advantageously optically irradiated. Furthermore, a conducting system 30 comprising further optical components is provided, the light that is provided for heating the first component 1 being directed onto the optical component 21 in the inner die cavity by way of the conducting system 30. Preferably, the optical component 21 and/or the further optical component comprises means for focusing 31 the light, such as for example hollow mirrors or lenses. As a result, the light can be advantageously focused onto the first and/or second subregion. As a consequence, the heating of the first component 1 is made more efficient than without focusing. In particular, it is provided that light from the light source 40 is used. The light source 40 is preferably a laser, in particular a diode laser. For spreading the beam of the light provided for the heating, the conducting system 30 also comprises for example a beam-spreading system, a collimator 33 and/or an axicon 32, the distance between and the positioning of the individual components being adjustable in order to obtain an optical irradiation of the first and/or the second subregion that is as efficient as possible. In this respect it is conceivable that the conducting system 30 is individually adapted to the inner die 20 that is respectively used. Furthermore, it is provided that the conducting system 30 is at least partially also used for observing the first subregion and/or the second subregion.

By observing the first subregion and/or the second subregion during the first and/or the third method step, the heating of the first component 1 can be advantageously re-corrected or controlled as promptly as possible.

As a result, energy can be advantageously saved in the production process. Moreover, potential problems in the method of producing the connection can be detected in good time, it being possible thanks to such early detection to take measures that counteract the problem in good time. A detector unit 38 is preferably used for observing the first and/or the second subregion. In particular, the detector unit 38 is a thermal detector, in particular a pyrometer. In this respect, it is conceivable that the image used for observing the first and/or the second subregion is coupled out from the conducting system 30 with the aid of beam splitters 34 and is directed onto the detector unit 38 with the aid of lens 36 and axicon 37. Furthermore, it is provided that the first component 1 at least partially comprises metal, in particular in the deformation region.

While specific embodiments of the invention have been shown and described in detail to illustrate the application of the principles of the invention, it will be understood that the invention may be embodied otherwise without departing from such principles.

The invention claimed is:

1. A method for connecting a first component to a second component, the method comprising the steps of:
providing the first component with a deformation region;
at least partially heating the deformation region;
providing an inner die with an optical component for plastic deformation;
plastically deforming the first component in the deformation region to connect the first component to the second component; and
directing light for heating the first component onto the deformation region by way of the optical component of the inner die for the step of at least partially heating the deformation region or for the step of plastically deforming the first component or for both the steps of heating the deformation region and plastically deforming the first component.

2. The method as claimed in claim 1, wherein the first component is formed by a hollow body with an axis of symmetry.

3. The method as claimed in claim 2, wherein:
the step of providing the inner die with the optical component includes arranging the inner die in the hollow body of the first component; and
the step of directing light for heating comprises directing light onto an inner side of the hollow body of the first component.

4. The method as claimed in claim 1, further comprising the step of removing the inner die from the first component.

5. The method as claimed in claim 1, wherein the deformation region is irradiated in a first subregion, the light for heating the first subregion being passed through a first clearance in a wall of the inner die.

6. The method as claimed in claim 1, wherein the light for heating the first component is conducted by way of further optical components comprising filters, lenses, beam-spreading systems.

7. The method as claimed in claim 1, further comprising monitoring a thermal state of the first component by a detector unit.

8. The method as claimed in claim 7, wherein, for monitoring an inner side of the first component, information concerning the thermal state is passed by way of the optical component to the detector unit.

9. The method as claimed in claim 7, wherein, for monitoring an inner side of the first component, information concerning the thermal state is passed by way of further optical components to the detector unit.

* * * * *